United States Patent
Abbas et al.

(10) Patent No.: US 11,477,395 B2
(45) Date of Patent: Oct. 18, 2022

(54) APPARATUS AND METHODS FOR THE STORAGE OF OVERLAPPING REGIONS OF IMAGING DATA FOR THE GENERATION OF OPTIMIZED STITCHED IMAGES

(71) Applicant: GoPro, Inc., San Mateo, CA (US)

(72) Inventors: Adeel Abbas, Belmont, CA (US); Cesar Douady, Orsay (FR); Timothy MacMillan, La Honda, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/240,868

(22) Filed: Apr. 26, 2021

(65) Prior Publication Data
US 2021/0321047 A1    Oct. 14, 2021

Related U.S. Application Data

(63) Continuation of application No. 16/666,221, filed on Oct. 28, 2019, now Pat. No. 10,992,881, which is a
(Continued)

(51) Int. Cl.
*H04N 5/265*   (2006.01)
*H04N 7/18*    (2006.01)
(Continued)

(52) U.S. Cl.
CPC ......... *H04N 5/265* (2013.01); *H04N 5/23238* (2013.01); *H04N 5/247* (2013.01); *H04N 7/181* (2013.01)

(58) Field of Classification Search
CPC .... H04N 5/265; H04N 5/23238; H04N 5/247; H04N 7/181
See application file for complete search history.

(56) References Cited

U.S. PATENT DOCUMENTS 8,395,657 B2   3/2013 Jacob
8,606,073 B2   12/2013 Woodman
(Continued)

FOREIGN PATENT DOCUMENTS

CN   105247573 A   1/2016

OTHER PUBLICATIONS

Achanta R., et al., 'Slic Superpixels Gompared to State-of-The-Art Superpixei Methods,' IEEE Transactions on Pattern Analysis and Machine intelligence, 2012, vol. 34 (11), pp. 2274-2282.
(Continued)

*Primary Examiner* — Twyler L Haskins
*Assistant Examiner* — Angel L Garces-Rivera
(74) *Attorney, Agent, or Firm* — Wang Hardoon, P.C.

(57) ABSTRACT

Apparatus and methods for stitching images, or re-stitching previously stitched images. Specifically, the disclosed systems in one implementation save stitching information and/ or original overlap source data during an original stitching process. During subsequent retrieval, rendering, and/or display of the stitched images, the originally stitched image can be flexibly augmented, and/or re-stitched to improve the original stitch quality. Practical applications of the disclosed solutions enable, among other things, a user to create and stitch a wide field of view (FOV) panorama from multiple source images on a device with limited processing capability (such as a mobile phone or other capture device). Moreover, post-processing stitching allows for the user to convert from one image projection to another without fidelity loss (or with an acceptable level of loss).

20 Claims, 8 Drawing Sheets

Related U.S. Application Data continuation of application No. 16/234,330, filed on Dec. 27, 2018, now Pat. No. 10,462,384, which is a continuation of application No. 15/406,175, filed on Jan. 13, 2017, now Pat. No. 10,194,097.

(51) Int. Cl.
  *H04N 5/232* (2006.01)
  *H04N 5/247* (2006.01)

(56) References Cited

U.S. PATENT DOCUMENTS

| | | | |
|---|---|---|---|
| 9,171,577 | B1 | 10/2015 | Newman |
| 9,575,803 | B2 | 2/2017 | Chauvet |
| 9,681,111 | B1 | 6/2017 | Newman |
| 10,462,384 | B2 | 10/2019 | Abbas |
| 10,992,881 | B2 * | 4/2021 | Abbas ............ H04N 5/23238 |
| 2002/0030748 | A1 | 3/2002 | Kitaguchi |
| 2003/0007567 | A1 | 1/2003 | Newman |
| 2006/0187234 | A1 | 8/2006 | Deng |
| 2016/0239340 | A1 | 8/2016 | Chauvet |
| 2016/0274338 | A1 | 9/2016 | Davies |
| 2016/0360104 | A1 | 12/2016 | Zhang |
| 2017/0006219 | A1 | 1/2017 | Adsumilli |
| 2017/0046820 | A1 | 2/2017 | Steel |

OTHER PUBLICATIONS

Allene C, et al,, 'Seamless Image-based Texture Atlases Using Multi-band Blending,' Pattern Recognition, 2008. ICPR 2008. 19th International Conference on, 2008. 4 pages.
Badrinarayanan V., et al., 'Segnet: a Deep Convoiutional Encoder-Decoder Architecture for Image Segmentation,' arXiv preprint arXiv: 1511.00561, 2015. 14 pages.
Barghout L. and Sheynin J., 'Real-world scene perception and perceptual organization: Lessons from Computer Vision'. Journal of Vision, 2013, vol. 13 (9). (Abstract). 1 page.
Barghout L., 'Visual Taxometric approach Image Segmentation using Fuzzy-Spatial Taxon Cut Yields Contextually Relevant Regions,' Communications in Computer and Information Science (CCIS), Springer-Verlag, 2014, pp. 163-173.
Bay H., et al., 'Surf: Speeded up Robust Features,' European Conference on Computer Vision, Springer Berlin Heidelberg, 2006, pp. 404-417.
Beier et al., 'Feature-Based Image Metamorphosis,' in Computer Graphics Journal, Jul. 1992, vol. 28 (2), pp. 35-42.
Brainard R.C., et al., "Low-Resolution TV: Subjective Effects of Frame Repetition and Picture Replenishment," Bell Labs Technical Journal, Jan. 1967, vol. 46 (1), pp. 261-271.
Burt et al., 'A Multiresolution Spline with Application to Image Mosaics,' in ACM Transactions on Graphics (TOG), 1983, vol. 2, No. 4, pp. 217-236.
Chan et al., 'Active contours without edges'. IEEE Transactions on Image Processing, 2001, 10 (2), pp. 266-277 (hereinafter 'Chan').
Chang H., etal., 'Super-resolution Through Neighbor Embedding,' Computer Vision and Pattern Recognition, 2004. CVPR2004. Proceedings of the 2004 IEEE Computer Society Conference on, vol. 1, 2004. 8 pages.
Co-pending U.S. Appl. No. 14/927,343, filed Oct. 29, 2015, 48 pages.
Co-pending U.S. Appl. No. 14/949,786, filed Nov. 23, 2015, 70 pages.
Co-pending U.S. Appl. No. 15/001,038, filed Jan. 19, 2016, 57 pages.
Co-pending U.S. Appl. No. 15/289,851, filed Oct. 10, 2016, 50 pages.
Co-pending U.S. Appl. No. 29/548,661, filed Dec. 15, 2015, 15 pages.
Elen, 'Whatever happened to Ambisonics' AudioMedia Magazine, Nov. 1991. 18 pages.
Gracias, et al., 'Fast Image Blending Using Watersheds and Graph Cuts,' Image and Vision Computing, 2009, vol. 27 (5), pp. 597-607.
Herbst E., et al., 'Occlusion Reasoning for Temporal Interpolation Using Optical Flow,' Department of Computer Science and Engineering, University of Washington, Tech. Rep. UW-CSE-09-08-01, 2009. 41 pages.
Jakubowski M., et aL, 'Block-based motion estimation algorithmsa survey,' Opto-Eiectronics Review 21, No. 1 (2013), pp. 88-102.
Kendall A., et al., 'Bayesian Segnet: Model Uncertainty in Deep Convolutional Encoder-Decoder Architectures for Scene Understanding,' arXiv: 1511.02680, 2015. (11 pages).
Lowe D.G., 'Object Recognition From Local Scale-invariant Features,' Computer vision, The proceedings of the seventh IEEE international conference on 1999, vol. 2, pp. 1150-1157.
Mitzel D., et al., 'Video Super Resolution Using Duality Based TV-11 Optical Flow,' Joint Pattern Recognition Symposium, 2009, pp. 432-441.
PCT International Search Report for PCT/US2017/067392 dated May 22, 2018, 5 pages.
Perez et al., 'Poisson Image Editing,' in ACM Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
Schwartz, E., et al., "Implementation of Compression with Reversible Embedded Wavelets," In Proc. SPIE, 1995, 12 pages.
Suzuki et al., 'Inter Frame Coding with Template Matching Averaging,' in IEEE international Conference on Image Processing Proceedings (2007), vol. (iII), pp. 409-412.
Szeliski R., "Computer Vision: Algorithms and Applications," Springer Science & Business Media, 2010, 979 pages.
Szeliski R., "Image Alignment and Stitching: A Tutorial," Foundations and Trends in Computer Graphics and Vision, 2006, vol. 2 (1), pp. 1-59.
Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.
Vass, J., et al., 'Efficient Three-Dimensional Wavelet Codecs for Networked Video Communication,' in Proceedings of IEEE International Conference on Image Processing, Kobe, Japan, Oct. 1999, pp. 565-569.
Xiao, et al., 'Multiple View Semantic Segmentation for Street View Images,' 2009 IEEE 12th International Conference on Computer Vision, 2009, pp. 686-693.
Xiong Y et ai 'Gradient Domain Image Blending and Implementation on Mobile Devices,' International Conference on Mobile Computing, Applications, and Services, Springer Berlin Heidelberg, 2009, pp. 293-306.
Zhai et al., "A Low Complexity Motion Compensated Frame Interpolation Method," in IEEE International Symposium on Circuits and Systems (2005), pp. 4927-4930.
Zhang., "A Flexible New Technique for Camera Calibration" IEEE Transactions, dated Nov. 2000, vol. 22, No. 11, pp. 1330-1334.

* cited by examiner

APPARATUS AND METHODS FOR THE STORAGE OF OVERLAPPING REGIONS OF IMAGING DATA FOR THE GENERATION OF OPTIMIZED STITCHED IMAGES

PRIORITY

This application is a continuation of and claims priority to U.S. patent application Ser. No. 16/666,221 entitled "APPARATUS AND METHODS FOR THE STORAGE OF OVERLAPPING REGIONS OF IMAGING DATA FOR THE GENERATION OF OPTIMIZED STITCHED IMAGES" filed Oct. 28, 2019, which is a continuation of and claims priority to U.S. patent application Ser. No. 16/234,330 entitled "APPARATUS AND METHODS FOR THE STORAGE OF OVERLAPPING REGIONS OF IMAGING DATA FOR THE GENERATION OF OPTIMIZED STITCHED IMAGES" filed Dec. 27, 2018, which is a divisional of and claims priority to U.S. patent application Ser. No. 15/406,175 entitled "APPARATUS AND METHODS FOR THE STORAGE OF OVERLAPPING REGIONS OF IMAGING DATA FOR THE GENERATION OF OPTIMIZED STITCHED IMAGES" filed Jan. 13, 2017, each of the foregoing incorporated herein by reference in its entirety.

RELATED APPLICATIONS

This application is related to U.S. patent application Ser. No. 15/289,851 filed Oct. 10, 2016 and entitled "APPARATUS AND METHODS FOR THE OPTIMAL STITCH ZONE CALCULATION OF A GENERATED PROJECTION OF A SPHERICAL IMAGE", which is incorporated herein by reference in its entirety. This application is also related to U.S. patent application Ser. No. 15/234,869 filed Aug. 11, 2016 and entitled "EQUATORIAL STITCHING OF HEMISPHERICAL IMAGES IN A SPHERICAL IMAGE CAPTURE SYSTEM", which claims the benefit of priority to U.S. Provisional Patent Application No. 62/204,290 filed on Aug. 12, 2015, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates generally to video image processing and in one exemplary aspect, to methods and apparatus for the storage and/or subsequent provision of overlapping regions of imaging data for the generation of optimized stitched images.

DESCRIPTION OF RELATED TECHNOLOGY

Spherical images are typically obtained by capturing multiple images with overlapping fields of view from different cameras and combining ("stitching") these images together in order to provide a two-dimensional projection. Conventional stitching algorithms may result in undesirable artifacts, including around the stitch lines, due to imperfections in the stitching process.

Different electronics devices may have different mobility, computational capabilities, display capabilities, power limitations, and/or other operational considerations. For example, a consumer device such as a mobile phone or multi-camera capture device may be convenient to capture source photographs during an outdoor activity, and/or quickly view a roughly stitched image, however it may lack the computational power to perform high quality stitching. Similarly, while a laptop or tower computer may have more than adequate compute power to perform high quality stitching, they are poorly suited to outdoor activities.

Unfortunately, existing image capture techniques and rendering formats "fix" a stitched image to a particular quality. For example, when a mobile device quickly stitches an image from multiple source images, the resulting stitched image cannot be re-stitched on a more capable machine; it is locked into the quality of the mobile device (which may be relatively poor).

Additionally, storing post-stitch data with the original source images may not always be feasible due to e.g., storage considerations.

Furthermore, observable quality is highly subjective and the user may be willing to accept a quickly stitched version with limited augmentation to a higher stitch quality. In some cases, this may even be limited to spatial regions of the same image or time regions of the same video stream.

Moreover, prior art techniques assume a particular projection (e.g., equirectangular (cylindrical), cubic, octahedral, and/or spherical projection) for stitching images (e.g., for so-called virtual reality (VR) content). Once an image has been stitched according to a first projection, the image cannot be changed to a different projection. Instead, if a different projection is desired, the source images must be re-stitched from scratch according to the new projection.

To these ends, techniques are needed to improve upon these conventional stitching algorithms. Moreover, improvements are needed to improve compression efficiencies associated with the transmission and storage of stitched images in order to, inter alia, more efficiently leverage the capabilities of rendering platforms and/or viewing applications, regardless of the original source images.

SUMMARY

The present disclosure satisfies the foregoing needs by providing, inter alia, methods and apparatus for stitching and/or re-stitching images, including at different qualities.

In one aspect, an apparatus configured to stitch source images according to a first stitching quality is disclosed. In one embodiment, the apparatus includes: two or more cameras characterized by two or more corresponding fields of view (FOVs); wherein the two or more corresponding FOVs are characterized by at least one overlapping region; a processor; and a non-transitory computer readable medium. In one exemplary implementation, the non-transitory computer readable medium includes one or more instructions which when executed by the processor, cause the apparatus to: obtain two or more images from the two or more cameras; identify the at least one overlapping region of the obtained two or more images; post-process the obtained two or more images to create a post-processed image; and store the post-processed image and one or more information associated with the identified at least one overlapping region.

In one variant, the identified at least one overlapping region of the obtained two or more images are identified based on a physical orientation of the two or more cameras and the two or more FOVs.

In another variant, the identified at least one overlapping region of the obtained two or more images are identified based on one or more shared features detected within the obtained two or more images.

In a third variant, the post-process includes a cut-and-feather stitch of the obtained two or more images.

In a fourth variant, the post-process includes a depth based stitch of the obtained two or more images.

In a fifth variant, the stored one or more information includes stitching confidence metrics.

In a sixth variant, the stored one or more information includes original pixel information associated with the at least one overlapping region.

In a seventh variant, the two or more image capture components include a first camera facing in a front orientation, and a second camera facing in a rear orientation. In one exemplary variant, the first and second camera are characterized by a corresponding first and second hyper-hemispherical FOVs.

A method for stitching source images according to a first stitching quality is also disclosed. In one embodiment, the method includes: obtaining two or more source images from two or more cameras; identifying at least one overlapping region of the obtained two or more source images; post-processing the obtained two or more source images to create a post-processed image; and storing the post-processed image and one or more information associated with the identified at least one overlapping region.

In one variant, the method includes displaying at least a portion of the post-processed image. In one exemplary variant, the post-processing further includes determining a projection for the displaying. In some such cases, the method may further include stitching at least a portion of the post-processed image based on the determined projection.

In another variant, the post-processing further includes determining a viewport to display. In one exemplary variant, the method further includes stitching at least a portion of the post-processed image based on the determined viewport.

In a third variant, the post-processing further includes determining one or more device resource limitations. In one such variant, the method further includes stitching at least a portion of the post-processed image to a reduced degree or extent based on the determined one or more device resource limitations.

An apparatus configured to re-stitch an image characterized by a first stitching quality to a second stitching quality is further disclosed. In one exemplary embodiment, the apparatus includes: a network interface; a processor; and a non-transitory computer readable medium including one or more instructions which when executed by the processor, cause the apparatus to: obtain at least a portion of the image characterized by the first stitching quality; determine a region of the at least the portion of the image to be re-stitched to a second stitching quality; obtain one or more information associated with the determined region; and re-stitch the region at the second stitching quality.

In one variant, the determined region corresponds to at least one overlapping region of two or more source images. In one such exemplary variant, the obtained one or more information associated with the determined region includes at least one of: (i) stitching confidence metrics, and (ii) original capture information from the two or more source images.

In a further aspect, a computer-readable storage apparatus is disclosed. In one embodiment, the apparatus includes a storage medium with a plurality of instructions which are configured to, when executed on a processing apparatus: obtain two or more source images from two or more cameras; identify at least one overlapping region of the obtained two or more source images; post-process the obtained two or more source images to create a post-processed image; and store the post-processed image and one or more information associated with the identified at least one overlapping region.

In a further aspect, an integrated circuit apparatus is disclosed. In one embodiment, the integrated circuit apparatus includes one or more application-specific integrated circuits (ASICs) which include circuitry configured to conduct image data post-processing, such as according to the method referenced supra.

In another aspect of the present disclosure, a computerized apparatus configured to re-stitch a stitched image is disclosed. In one embodiment, the computerized apparatus includes: non-transitory computer-readable apparatus including a storage medium in data communication with processor apparatus and including at least one computer program, the at least one computer program including a plurality of instructions which are configured to, when executed by the processor apparatus, cause the computerized apparatus to: obtain data comprising: (i) at least a portion of the stitched image, and (ii) information related to a stitch area, the stitch area associated with the at least portion of the stitched image; determine a re-stitch line based at least on the information related to the stitch area; retrieve one or more overlapping portions of the stitched image; and generate an image projection of the one or more overlapping portions based at least on a re-stitch of the stitch area using the determined re-stitch line, the re-stitch of the stitch area being based at least on a second stitching quality that is higher than a first stitching quality associated with a previous stitch of the stitched image.

In another aspect of the present disclosure, an integrated circuit apparatus is disclosed. In one embodiment, the integrated circuit apparatus includes computerized logic, the computerized logic being configured to, when operated: receive data related to a portion of a previously stitched image, the data comprising metadata related to a stitched area within the portion of the previously stitched image; based at least on the metadata, select a re-stitch line that differs from a stitch line associated with the previously stitched image; and generate, via a re-stitch of the stitched area based on the selected re-stitch line, a re-stitched image.

In another aspect of the present disclosure, a computerized method of re-stitching a stitched image is disclosed. In one embodiment, the computerized method includes: retrieving a data structure comprising (i) at least a rendered portion of the stitched image and (ii) metadata related to the stitched image; determining, based at least on the metadata and the at least portion of the stitched image, an area of the stitched image to be re-stitched; retrieving one or more portions of the stitched image, the one or more portions of the stitched image associated with a selected re-stitch line; and producing a re-stitched image based at least on the retrieved one or more portions of the stitched image.

Other features and advantages of the present disclosure will immediately be recognized by persons of ordinary skill in the art with reference to the attached drawings and detailed description of exemplary implementations as given below.

DETAILED DESCRIPTION

Figure 1:
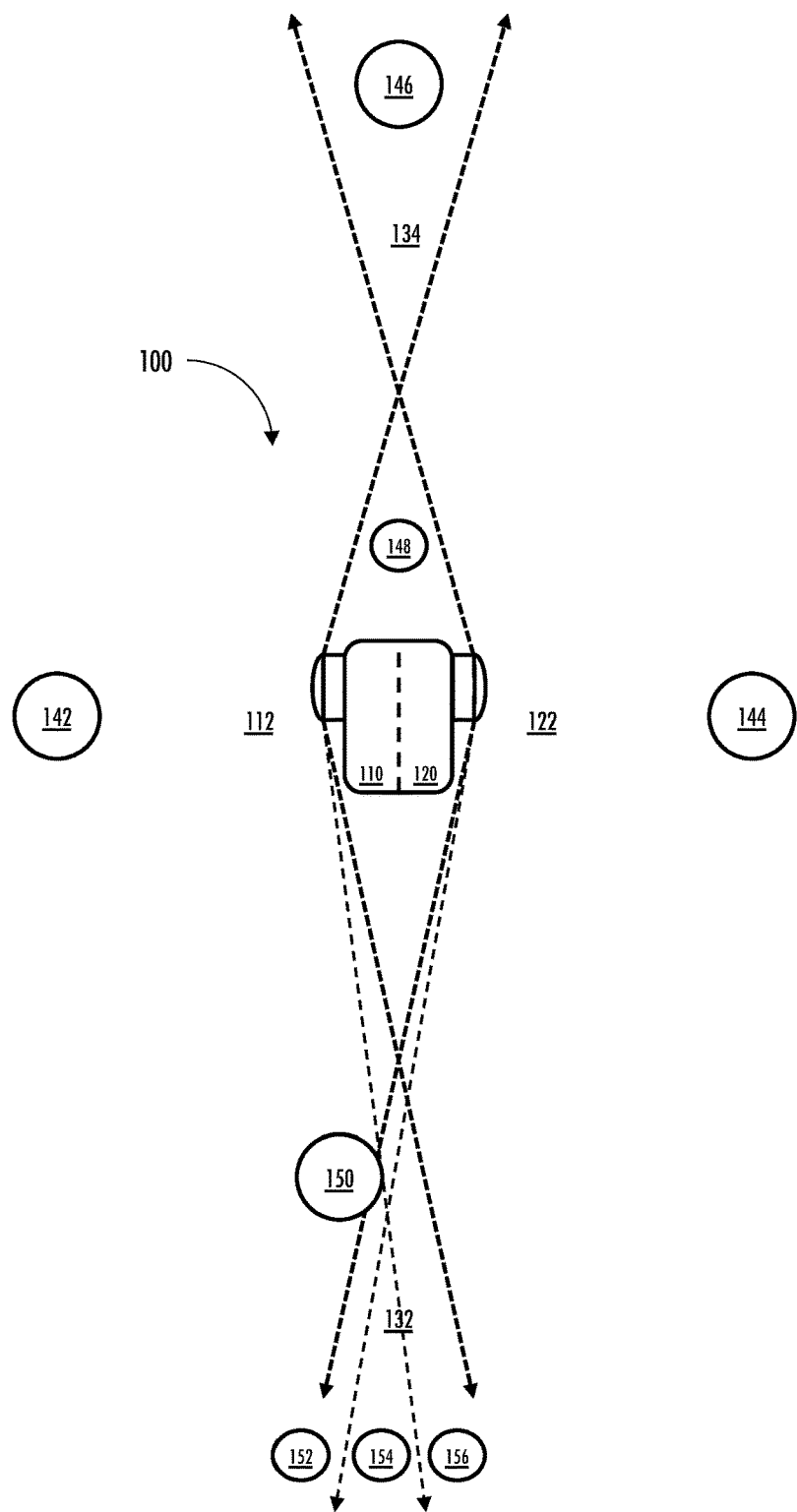
FIG. 1 is a block diagram of one exemplary spherical camera system, in accordance with the principles of the present disclosure.

Implementations of the present technology will now be described in detail with reference to the drawings, which are provided as illustrative examples and species of broader genera so as to enable those skilled in the art to practice the technology. Notably, the figures and examples below are not meant to limit the scope of the present disclosure to any single implementation or implementation, but other implementations are possible by way of interchange of, substitution of, or combination with some or all of the described or illustrated elements. Wherever convenient, the same reference numbers will be used throughout the drawings to refer to same or like parts.

Moreover, while implementations described herein are primarily discussed in the context of spherical images that are captured using a spherical camera system having two (2) cameras (e.g., a front-facing and a rear-facing camera), it is readily appreciated that the principles described herein can be equally applied to other camera configurations. For example, when obtaining panoramic (e.g., 360°) content, three or more images from three or more cameras may be combined (stitched).

Additionally, while primarily discussed in the context of camera configurations in which each of the centers of view for the respective cameras reside on a given two-dimensional plane, it is readily appreciated that one or more of these cameras can reside such that their center of view is focused at an azimuthal angle (e.g., at 45°), with respect to the given two-dimensional plane for other one(s) of the cameras.

Those of ordinary skill in the related arts will also readily appreciate that symmetric and asymmetric camera configurations can be substituted with equivalent success. For example, a symmetric dual camera system (a Janus configuration) may have fisheye lenses that provide a field of view (FOV) that is greater than 180. In asymmetric implementations, the cameras may have different FOV angles; e.g., a higher resolution 195° front-facing camera, and a lower resolution 245° rear-facing camera. Such implementations may be useful to store front and back images according to a common format size, while still providing higher resolution for objects within the field of interest (e.g., the front camera's perspective).

While the present disclosure is presented within the context of static photography, artisans of ordinary skill in the related arts will readily appreciate that the various principles described herein may be applied to a wide range of imaging applications, including e.g., video capture, video rendering, virtual reality, augmented reality (AR). For example, a panorama image can be generated from a video capture while rotating a camera (e.g., stitching together the individual frames in time as different fields of view (FOV)). Similarly, source images may be dynamically stitched together during a video playback (e.g., for virtual reality (VR), augmented reality (AR) applications, mixed reality, augmented virtuality, and/or other hybridized realities).

These and other variations would be readily apparent to one of ordinary skill given the contents of the present disclosure.

Overview

Various aspects of the present disclosure are directed to improved solutions for stitching, as well as re-stitching previously stitched images. Specifically, during an original stitching process, in addition to storing the resulting stitched image, the disclosed systems also save stitching information and/or original overlap source data. During subsequent retrieval, rendering, and/or display of the stitched images, the originally stitched image can be flexibly augmented, and/or re-stitched to improve the original stitch quality.

Practical applications of the disclosed solutions enable a user to, inter alfa, create and stitch a wide field of view (FOV) panorama from multiple source images on a device with limited processing capability (such as a mobile phone or other capture device). The convenience of being able to immediately view the panorama (at the time of capture) may be more important than the lower quality of the initial stitching. Subsequently thereafter, once the user has access to more capable rendering (e.g., at home or via data network access), the quickly stitched image may be re-stitched at a higher quality.

In some cases, the re-stitching may be selective; for example, various portions of the image can be re-stitched at higher quality, whereas other portions of the image may retain the lower quality stitching. Such techniques may be especially useful in applications that do not render the entire stitched image at once; for example, virtual reality (VR) and augmented reality (AR) only render the portion of the image that the viewer is "looking" at (i.e., the viewport). This is especially useful in a resource limited device e.g. smartphone which does not have to perform re-stitching on the entire image. More directly, the degree and/or extent of stitching may be limited based on device limitations e.g., processing or memory resources. In related embodiments, various frames of a video may be re-stitched at higher quality, whereas other portions of the video may be left at the original lower quality stitching. Selectivity may be based on the quality of the original stitching; in other words, where the original stitch was sufficient, the improvement of re-stitching may not be worth the additional processing effort.

Selectivity may also be based on the application; for example, in a rapidly moving video sequence, the user is unlikely to perceive any difference in image quality, however in slow moving video, stitching artifacts may be much more noticeable. Selectivity may also be based on distance of the objects from the camera system. Closer objects may require high quality depth based stitching due to greater parallax effects, but farther objects may not require advanced stitching.

Additionally, artisans of ordinary skill in the related arts will readily appreciate, given this disclosure, that saving the stitching and overlap region within a common data format enables multiple devices to intelligently request, provide, and/or retrieve only as much information as is necessary to construct or reconstruct a stitched image for the appropriate application. Accordingly, a first device can retrieve the original image and re-stitch the image according to a first projection (e.g., an equirectangular projection), while a second device can retrieve the original image and re-stitch the image according to a different second projection (e.g., a cubic or spherical projection). Moreover, as discussed in greater detail hereinafter, converting from one projection to another may not always require re-stitching; it may be enough to warp or stretch portions of an existing projection, and selectively re-stitch only where the two projections differ. For example, an equirectangular projection can be converted to a spherical projection with much less effort by stretching/warping the bulk of the image; only the poles of the image need to be re-stitched.

Example Image Capturing System

FIG. 1 illustrates an embodiment of an example spherical camera system 100 that may include a first camera 110 capturing a first field of view 112 and a second camera 120 capturing a second field of view 122. In one or more implementations, the cameras 110, 120 may be integrated in a back-to-back configuration in which cameras 110, 120 face opposite directions. For example, in operation, the first camera 110 may be a "front-facing" camera 110 such that a user may point the first camera towards an object or scene of interest and the second camera 120 may be a "rear-facing" camera facing in an opposite direction of the front-facing camera 110. While the designations of front-facing and rear-facing are useful in describing the example processes described herein, these designations are arbitrary and the camera system 100 may operate in any orientation.

The fields of view 112, 122 may each include a hyper-hemispherical field of view that captures slightly greater than a 180° range in at least one direction. Because the respective fields of view 112, 122 are hyper-hemispherical (e.g., greater than 180°), they overlap in overlapping regions 132, 134 near their respective boundaries. For example, the fields of view 112, 122 may overlap by n degrees (e.g., where n equals 1°, 5°, 10° or other various degrees of field of view overlap between, for example, a front-facing and rear-facing camera). These overlapping regions 132, 134 may be used for the stitching of separately captured images obtained by the respective cameras 110, 120, as will be described in further detail below. In implementations where the respective field of view ranges are equal for each of the first camera 110 and the second camera 120, these configurations will be referred to hereinafter as symmetric lensing configurations.

In some implementations, the first camera 110 may be configured to capture one range in at least one direction (e.g., 195°), while the second camera 120 may be configured to capture a different range in at least one direction (e.g., 225°). In other words, the first and second cameras 110, 120 may capture differing ranges in their respective fields of view 112, 122 so long as their fields of view overlap in at least one overlapping region 132,134. In implementations where the respective field of view ranges differ for each of the first camera 110 and the second camera 120, these configurations will be referred to hereinafter as asymmetric lensing configurations.

It will be appreciated that certain camera configurations contain three (or more) cameras; the corresponding field of views for these cameras don't necessarily have to be hyper-hemispherical (i.e., greater than 180°). For example, in an implementation that utilizes three cameras, each of these cameras may capture an image that has a field of view that is greater than a 120° range in at least one direction, so that the resultant images may be stitched together into a full 360° field of view. Implementations that utilize three (or more) cameras may collectively contain either a symmetric lensing configuration or, alternatively, may collectively contain an asymmetric lensing configuration. Similarly, where a complete panorama is not required (e.g., less than a full 360° field of view), fewer cameras with reduced view angles can be used with equivalent success.

The number of pixels in a camera sensor and the field of view (FOV) are typically "fixed" in a camera system and do not change during use. Generally, the manufacturer will design the camera to suit the intended application(s). For instance, an activity camera that is mobile and rugged will have different capture parameters than a cinema-quality camera designed for e.g., crane mounts or other bulky steadying platforms. Artisans of ordinary skill in the related arts will readily appreciate that the same number of pixels may be used to capture a larger field of view (FOV) at lower resolution, or a smaller FOV at a higher resolution. For instance, a ten (10) Megapixel (MP) camera sensor that is coupled to a 195° FOV lens provides a higher resolution than the same 10 MP camera sensor used for a 245° FOV lens.

As shown in the configuration of FIG. 1, the overlapping regions 132, 134 are fixed and do not change during use. Camera manufacturers may design the camera body with larger or smaller overlap regions; a larger overlap region may be used for better quality image stitching but can result in an overall drop in image resolution as a result of a lower amount of pixels per degree of FOV. Conversely, a smaller overlap region may be used for lower quality image stitching but may result in an overall increase in image resolution for the captured image.

In other designs, the overlapping regions may be configurable, due to changes in the camera body and/or lens. Video variants may even be able to dynamically change overlap regions during an ongoing capture. For example, video cameras may have optical lens elements that can physically change (even during ongoing capture) e.g., a zoom body that allows the camera to change the focal length. Similarly, static cameras are commonly designed with modular components that can be changed out; for example, different lens attachments can impart different view angles and/or focal lengths. Some cameras may even be constructed to allow different sensors or may selectively use different sensors with different capture characteristics (e.g., switching between optical and IR sensors, or between higher and lower capture quality sensors).

As a brief aside, artisans of ordinary skill in the related arts will readily appreciate, given this disclosure, that objects within the overlap region may be redundantly captured in one or both FOVs. Referring back to FIG. 1, a number of example objects (142, 144, 146, 148, 150, 152, 154, 156) are shown to illustrate the potential limitations and blind spots of the exemplary camera system. As shown, object 142 shows up only in the first field of view 112, and object 144 shows up only in the second field of view 122. Object 146 shows up in both the first field of view 112 and the second field of view 122; whereas object 148 is in a negligible "blind spot" of both fields of view (typically within a few inches of the camera). Object 150 is partially in the overlapping region 132; thus, object 150 is fully visible for the first field of view 112, but only partially visible in the second field of view 122. Additionally, object 150 creates a temporary blind spot: object 152 is completely hidden from both fields of view, object 154 is hidden from the first field of view 112, and object 156 is visible to both fields of view.

When stitching source images from the two (2) fields of view together, the stitching algorithm should ideally reconcile at least any salient differences between the two (2) source images. For example, objects 146 and 156 of FIG. 1 will appear slightly different between the two (2) source images due to parallax effects. Similarly, object 150 will be fully visible in the first source image and only partially visible in the second source image. Object 154 will only be visible in the second source image. Object 152 was present in both source images until occluded by object 150; thus, depending on the particular imaging application, object 152 (or a portion thereof) may be selectively rendered. For example, a video of object 152 passing behind object 150 may selectively render from the first field of view to the second field of view to more closely mimic expected physics (e.g., a constant velocity of movement).

As used herein, the term "parallax" refers without limitation to a displacement or difference in the apparent position of an object viewed along different lines of sight. Parallax can be mathematically expressed or described with the angle or semi-angle of inclination between the lines of sight. As used herein, the term "perspective" refers to a warping or difference in the apparent dimensions of an object viewed along a line of sight.

As used herein, the term "redundant" within the context of source images, refers without limitation to pixel information that is found in multiple source images. Redundant information may be introduced by parallax effects and can be reconciled together to generate stitched output information. In contrast, as used herein, the term "singular" within the context of source images, refers without limitation to pixel information that is only found in a single source image. Singular information may be caused by blind spots or other occlusions and cannot be reconciled between images without introducing undesirable artifacts (e.g., translucency, warping, or other undesirable visual effects).

Redundantly captured information can be used in the stitching process to improve stitching. For example, sophisticated stitching techniques may attempt to use parallax information to discern distances and/or evaluate depth of the field of view. Still other techniques may intelligently weight or select (to the exclusion of others) singular pixel information from each field of view. However, simple stitching techniques may not differentiate between redundant and singular information; e.g., simple stitching may use a relatively simple cut-and-feather scheme, averaging scheme, or other unilaterally applied filtering technique.

Existing prior art stitching techniques generate a stitched image from multiple source images; however, the information within the overlap region is not also stored (and is lost). In other words, subsequent modifications to a file do not have the benefit of the original source information. For example, a post-processing video editor cannot tell from the pixel information whether it was generated from redundant pixel information or selected from singular pixel information. The disclosed embodiments of the present disclosure retain such information for pixels within the overlap regions, and thus enable flexible post-processing of stitched images.

Exemplary Capture, Stitching, and Re-Stitching Methodologies

The processes described herein may be performed by a video processing system including at least one processor and a non-transitory computer-readable storage apparatus having a storage medium. The storage medium stores a number of computer-executable instructions thereon, that when executed by the at least one processor, cause the at least one processor to perform the processes described herein. In an embodiment, the video processing system may be partially or wholly implemented in the camera 100 or may be implemented partially or wholly in an external device (e.g., in a computing device that is separate from the camera system 100 that obtained the resultant images). The various projection methodologies described herein are useful in, for example, the compression, storage and/or transmission of this captured video data.

Additionally, the processes and methodologies described herein (or portions thereof) may be performed by dedicated computerized system logic, including without limitation, application-specific integrated circuits (ASICs), field-programmable gate arrays (FPGAs), and/or other types of integrated circuits or dedicated computerized logic that may be utilized in addition to, or alternatively from, the aforementioned computer-readable storage apparatus.

Figure 2:
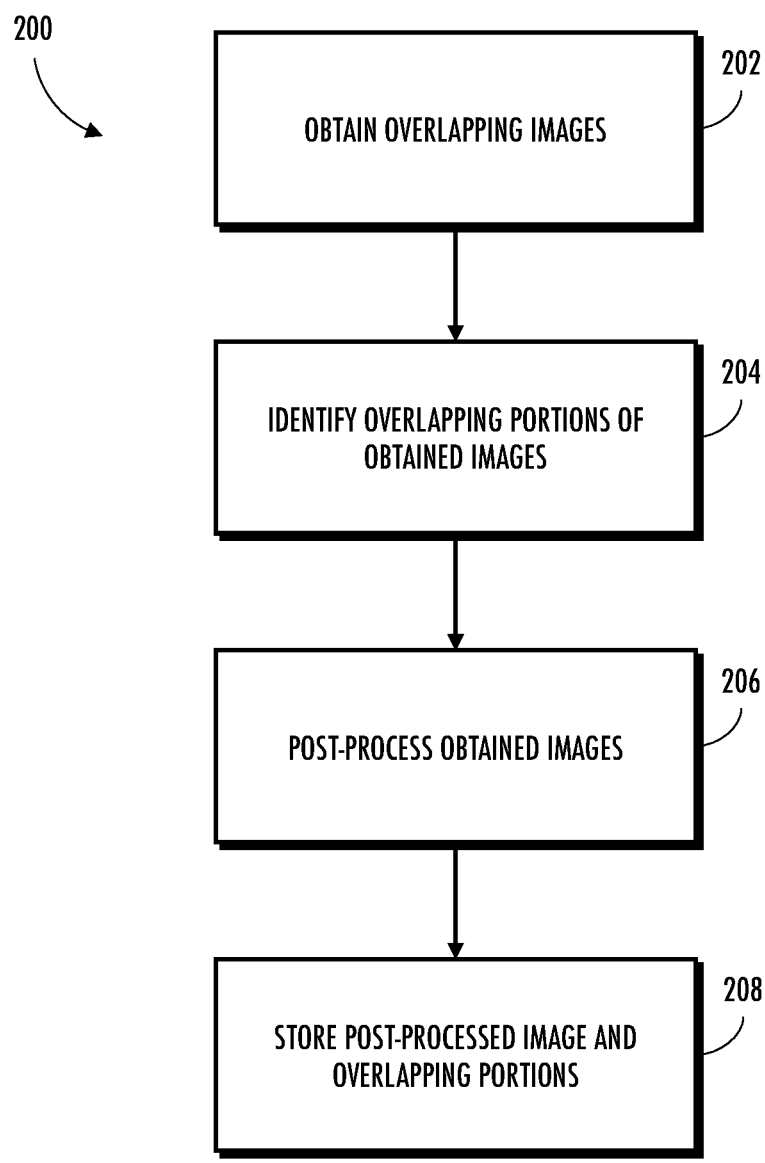
FIG. 2 is a logical flow diagram of a method for stitching source images according to a first stitching quality, in accordance with the principles of the present disclosure.

FIG. 2 illustrates a generalized method for stitching source images according to a first stitching quality.

At step 202 of the method 200, one or more source images are obtained. In one embodiment, the source images are obtained from multiple cameras that are oriented with a fixed or otherwise known relationship to one another. Common examples of a fixed or known relationship are e.g., a Janus type camera body, a multi-lens body (e.g., a three (3), four (4), five (5), six (6) or more camera body). Certain vehicles, cranes or filming rigs may have multiple camera or sensor mounts at fixed positions relative to one another, as may certain military aircraft. While such configurations may vary widely from one shoot to another, for the duration of use, the cameras do not change with relation to one another.

In another embodiment, the source images are obtained from multiple cameras that are oriented according to a dynamic relationship that is identified based on e.g., sensors within the camera or camera fixture. For example, the camera may have accelerometers, motion detection, and/or location determination systems (e.g., Global positioning system (GPS)) that allows the camera to infer the relative positioning of the FOV for each source image. For example, certain sophisticated camera rigs may have stabilization mechanisms that enable the cameras to move to a limited degree in order to capture a more stable image. Such stabilization information may be either directly captured (via accelerometer or other motion sensor data), or may be inferred from the captured image (as described in greater detail hereinafter). Based on the relative movements of cameras with respect to one another, the overlapping region will change in size (e.g., the FOVs may drift together or apart relative to one another)

In still other embodiments, the source images are obtained without any positional information, and the relative positions of the source images is inferred from the image data. For example, a user or post-processing engine may be able to identify reference points and/or edges which are shared between the source images. Reference points may be provided with illuminated dots (such as via a laser pointer, or other pointing device), reflective tape, or other visible indicia. In some embodiments, the indicia may be non-visible (e.g., infrared, sonic, or other non-perceptible signaling). Such indicia may be provided in peripheral regions that are of limited interest (and can be edited out without affecting the subject). Similarly, reference edges, lines and/or planes may be used with equivalent success, by an artisan of ordinary skill in the related arts, given the contents of the present disclosure.

At step 204 of the method 200, overlapping portions of the one or more source images and non-overlapping portions are identified. In one exemplary embodiment, the overlapping and non-overlapping portions of the source images are determined according to the fixed physical parameters of the camera system e.g., based on a known view angle of the lenses and the separation between the lenses, the overlap region can be described as the region of each image that corresponds to the other image's region at an infinite distance (where parallax is effectively zero (0)). For example, in the exemplary Janus camera system 100 of FIG. 1, the overlap region corresponds to view angles larger than 180°; i.e., at an infinite distance, both front-facing and rear-facing cameras will resolve an object on the 180° meridian identically. Artisans of ordinary skill in the related arts will readily appreciate that this technique can be extrapolated for virtually any camera system; for example, a symmetric three (3) camera system would have overlap regions at 120° sectors, similarly a symmetric four (4) camera system would have overlap regions at 90° quadrants.

Figure 3:
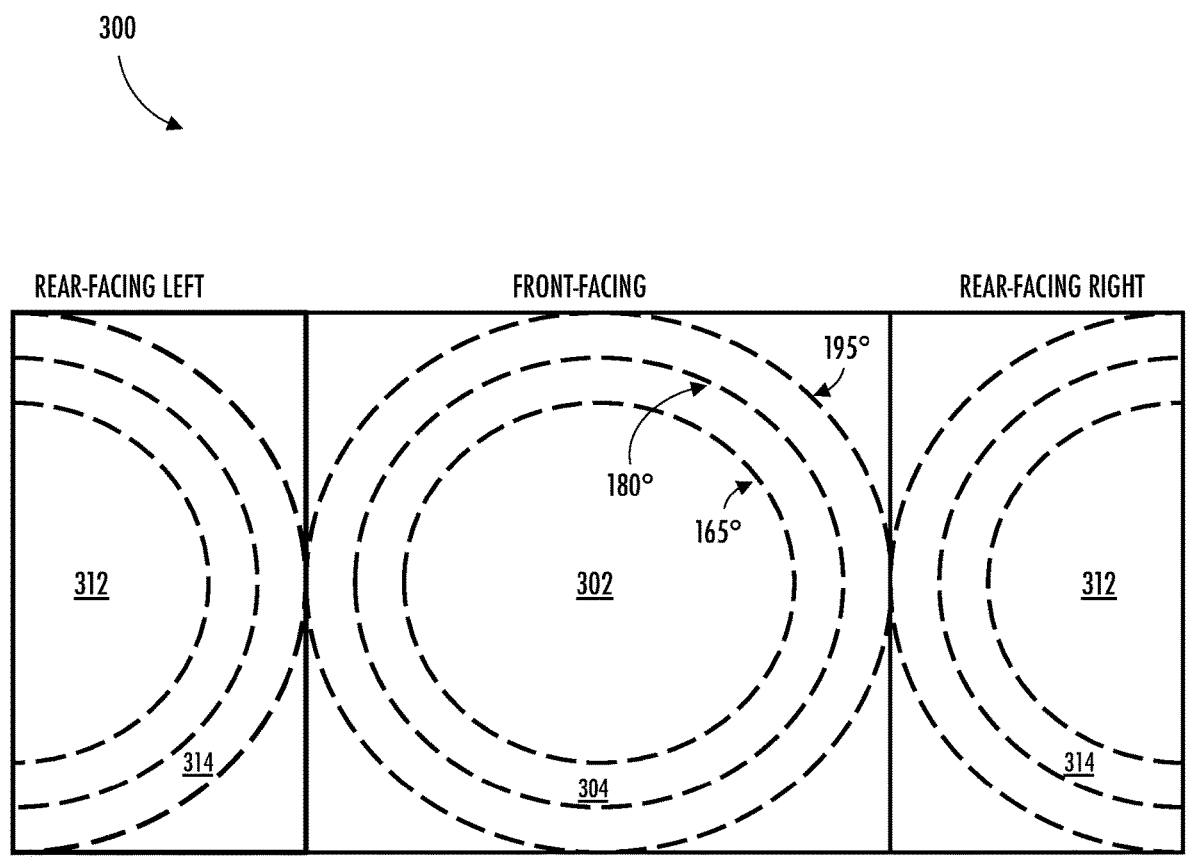
FIG. 3 is a logical representation of one exemplary file format used with the exemplary camera system of FIG. 1, illustrative of the principles of the present disclosure.

In one exemplary embodiment, the camera system may tag certain portions of the source images as overlapping or non-overlapping regions; for example, FIG. 3 illustrates one (1) exemplary file format 300 used with the exemplary camera system 100 of FIG. 1. As shown, the exemplary file format 300 includes two (2) halves of the rear-facing source image, that border the front-facing source image. The front-facing source image is a hyper-hemispherical fisheye lens photograph; the image has a non-overlapping portion 302 which corresponds to a 165° field of view (FOV), and an overlapping portion 304 which corresponds to view angles above 165° to 195°. The rear-facing source image halves (right and left) have a corresponding non-overlapping 180° FOV 312 and an overlapping portion 314 which corresponds to view angles above 165° to 195° FOV. The illustrated format provides a central front-facing image; other file formats may use a side-by-side format, top-bottom format, or other formatting.

The front-facing and rear-facing images are circular because they represent the entire fields of view as seen by the respective cameras 110, 120 (as opposed to a cropped rectangular field of view captured by a traditional camera). In an embodiment, the circular images may be captured by using only a circular region of a respective square or rectangular image sensor. Alternatively, the circular images may be captured using respective circular image sensors. The circular images may each represent a hyper-hemispherical field of view (e.g., n degrees greater than a hemisphere in at least one direction (referenced supra)). Thus, there may be overlap in the respective fields of view near the edges of the respective images. As discussed in greater detail hereinafter, the overlap may be used to align features present within both images for stitching of these images.

In some embodiments, the camera system may change the overlap region (possibly dynamically during an ongoing video capture). For example, the camera body itself can be modified with e.g., modular lens components and/or physically adjustable lens distances. In such implementations, physical capture information may be tagged with the one or more source image data as e.g., metadata. Such metadata may include capture characteristics, including but not limited to, field of view, lens position, focal length, optical center, camera skew, radial distortion, tangential distortion, and any other parameters which may assist in determining the overlap region.

In other embodiments, the overlapping and non-overlapping portions of the image may be identified with post-capture processing. The overlap region occurs where the source images have no noticeable parallax effect. Practical implementations will experience differences in capture conditions (e.g., white balance, lighting, manufacturing tolerances, lens distortion effects) which are not attributable to parallax; however, the overlap region can be detected where non parallax based non-parallax-based differences can be identified and removed/disregarded. For example, the front-facing and rear-facing fisheye source images can be mapped to a rectilinear image, color balanced, and compared. Areas that do not exceed a threshold tolerance correspond to the overlap region. Moreover, objects that are within the overlap region and that experience parallax can be readily identified with such a comparison; the pixel areas that experience parallax can be flagged for additional processing during subsequent stitching efforts.

In some embodiments, the identification of overlapping or non-overlapping regions of the source image may be identified relative to the image dimensions. For example, a non-overlapping region may be identified with a first radial distance from the center of the source image, and the overlapping region may be identified as the area between the first radial distance and a second radial distance. In other embodiments, the non-overlapping region may be identified, and the overlapping region encompasses everything else (or vice versa). Still other variants may use a point other than the center point (e.g., a corner, an offset center, or some other reference point), or dimensions or coordinate systems other than radial (e.g., Cartesian coordinates, polar coordinates).

In some implementations, the identification of overlapping or non-overlapping regions of the source image may be defined based on geometric shapes. For example, a non-overlapping region may be identified with a circle, and the overlapping region may be identified as a ring. Other implementations may use rectangles, squares, ovals, egg-shapes, or virtually any other polygon or rounded polygon-based definition.

In more complex embodiments, the source images may have a hot-coded bit map to identify overlapping or non-overlapping regions (e.g., where each bit of the map indicates whether the corresponding pixel information is in the overlap or non-overlap region); such implementations may be particularly useful for complex definitions (e.g., multiple cameras with different view angles and/or relative positioning, moving/panning video, or other irregularly defined region). In some cases, the hot-coded bit map may be further compressed to reduce size. While the foregoing hot-coded bit map is described, artisans of ordinary skill in the related arts will recognize that virtually any data structure may be used with equivalent success; common examples include without limitation, hash tables, arrays, multidimensional arrays, and strings.

Once the source images have been partitioned into overlapping and non-overlapping portions, the source images can be used in a number of subsequent stitching, rendering, displaying, editing, or other image processing tasks. For example, the overlap information may be used to assist in color balancing between front and back images. More generally, artisans of ordinary skill in the related arts will readily appreciate, given the contents of the present disclosure, that the overlap region may be used to assist re-encoding, re-projection image development and/or image post processing. In one exemplary embodiment, at step 206 of the method 200, the one or more source images are stitched together according to a first stitching quality based on the overlap region information.

Stitching techniques attempt to minimize parallax, lens distortion, scene motion, and exposure differences between the source images. Consider a panoramic capture under natural lighting conditions: the portion of the panorama that is between the camera and the sun will be backlit by sunlight, whereas the portion of the panorama that is taken with the sun to the back of the camera will be frontlit. Most camera sensors cannot capture the full range of exposure and will limit itself to the range of exposure that provides the best fidelity. Thus the backlit portion of the image will typically have a different exposure than the frontlit portion. If the two images are stitched together without blending, then there will be a visible seam due to the different exposures of the source images. Artisans of ordinary skill will readily appreciate, given this disclosure, that a similar "seam" effect can be introduced by different focal lengths, different color balances, different times of capture (especially where there is motion), and/or any other difference in capture parameters between the source images.

As used herein, the term "stitching" refers to the process of combining multiple photographic images with overlapping fields of view to produce a stitched image with a substantially larger field of view, higher quality and/or improved resolution. There are a number of image stitching techniques, and most approaches give more seamless results when the overlapping regions between source images have similar capture conditions (e.g., lighting, perspective, color balance, focus.) However, some stitching techniques may be able to leverage advanced image processing techniques in regions of overlap to compensate or even benefit from such differences; for example, image information that is captured under a low light exposure can be combined with image information at a higher light exposure to emulate a larger dynamic range of exposure than would otherwise be possible with the camera sensor (also commonly referred to as High Dynamic Range (HDR) photography). Typically, an overlap region of 15%-30% of the total field of view (FOV) can be used to reconcile and blend away differences between the source images to create an aesthetically "seamless" image.

One technique for quickly stitching together source images is so-called "cut-and-feather" stitching. The first step of a cut-and-feather stitch is to cut (crop out) portions of a source image that extend beyond the stitch. For example, with the Janus configuration of FIG. 1, the stitch is located at the 180° meridian. In some variants, the images may be cropped to favor one of the source images. For example, a first source image may have better image quality through 190° of view, therefore the counterpart second source image is cropped at a corresponding 170°. Moreover, since quality may vary over the image, it is further appreciated that different portions of a source image may be preferentially weighted. For example, a first source image may have a better or worse image quality in a certain subset of the overlap (and treated with a larger or smaller cropping area), whereas the remaining portions of the image are cropped at the default (e.g., 180°).

The resulting cropped images are joined and "feathered." Here, feathering generally refers to, without limitation: blending filtering, blurring, sharpening, burning, and/or any number of other image processing techniques. More generally, feathering reduces or obfuscates the seam by averaging the differences in pixel values across the seam. Feathering is limited in effectiveness because it only considers the pixel information of the source images, and may introduce some undesirable artifacts into the resulting image (e.g., ghosting, translucency, etc.) However, feathering is computationally simple and can be performed with very little processing effort (and can be performed in varying degrees). Feathering is suitable for use on most mobile platforms, and/or where stitching must be done quickly (e.g., streaming video).

Cut operations and feather operations are well understood by artisans of ordinary skill; for example, additional details for cutout and feather type operations are described within "*Image Alignment and Stitching: A Tutorial*," preliminary draft published Sep. 27, 2004 to Richard Szeliski, incorporated herein by reference in its entirety. Still other techniques and/or variations may be made by artisans of ordinary skill in the related arts, the foregoing being purely illustrative.

In some implementations, a cut-and-feather stitch may also provide some information as to the degree of confidence of the stitch. Simple metrics may include, without limitation: the differences in pixel information at the seam prior to feathering (e.g., a sum of difference, or sum of square of difference, or other metric), the amount of feathering (e.g., a sum of changes to pixel values), and/or other quantitative measures of smoothing. More complicated metrics may include e.g., user identified artifacts, holistic measures of the image (including portions outside of the stitch), and/or other metrics.

Various other techniques for stitching images may be used consistent with the present disclosure, the foregoing being purely illustrative. Common examples of such techniques include without limitation: cut-and-feather stitching, depth-based stitching, and multi-band stitching.

In some embodiments, the overlap region includes redundant information from multiple source images. For example, in a six (6) sided cube system camera, the corners of the cube will capture three (3) distinct vantages (e.g., a left, a right, and a top perspective). Still other camera systems may incorporate stereo vision (e.g., two or more lenses providing a stereo view) for use in e.g., 3D video and photography. In another example, a panning video capture can be divided into individual frames, and then stitched together. Video capture embodiments may use many frames (at many different perspectives) to perform stitching. Additionally, while the following description is presented within the context of visible light, other forms of image capture may be used with equivalent success. Common examples include without limitation, infrared, sonic, radar, lidar, and/or any other form of capture. In some cases, different capture technologies can provide a diversity of information more easily than visual imagery. For example, a sonar/visible light hybrid system can provide depth information and visible light information.

Various different stitching quality metrics may be gathered. Stitching metrics may be based on the original quality of the source images e.g., a blurry or under exposed image provide considerably less information during stitching. Stitching metrics may also quantify the differences between the original source images at the stitch (e.g., the amount of disparity at the stitch, larger disparities result in poorer results). Under such measures, the difference in the stitch may be quantified in the amount of adjustment to pixel values; e.g., larger shifts in color values may indicate poor stitching. In other measures, the difference in the stitch may be quantified by the absolute number of pixels which changed (rather than a measure of pixel information). Additionally, changes to source images may be weighted differently. For example, a source image with dubious image quality (e.g., due to underexposure) may have an underweight effect on the resulting stitch.

Still other stitching metrics may quantify holistic differences between the post-stitch image and its original source images. Stitching that has warping or skewing that appears to be multimodal (with multiple maxima/minima) is unlikely to be attributable to mere differences in perspective and are more likely due to an unintentional "fold-in" stitch (where falsely matched distinct features of the source images were "folded" together into one feature). Similarly, excessive warping or skewing is also undesirable and may indicate problems with the originally captured source images. Some stitching metrics may attempt to quantify undesirable artifacts (e.g., blurriness, sharpness, unusual coloration). More generally, artisans of ordinary skill in the related arts will readily appreciate that virtually any "confidence" metric can be used to convey the quality of the stitched result.

Additionally, it should be recognized that some metrics are specific to a particular application. For example, a video that is constructed from stitched images may experience unusual effects as objects pass through the seam. The individual stitched images may be well stitched on a frame-by-frame basis; however, when viewed together, an object with a constant velocity may appear to "bump" through the seam. In some cases, such motion may be reflected in subsequent encoding of the resulting video (e.g., motion vectors that are generated during e.g., MPEG encoding). Similarly, in some cases, video of fast-moving objects may be more aesthetically pleasing if allowed to retain motion blur rather than being unnaturally "sharpened". Also, 3D applications may need to retain parallax effects and/or focal distance blurring to allow for "natural" depth perception. Other application specific considerations will be made apparent to those of ordinary skill in the related arts, given the contents of the present disclosure.

Stitching quality may be localized to a spatial location within the stitched image. For example, consider an object that is occluded from one source image but present in the other. The remaining portions of the stitched image may be well stitched; however, the object itself will be difficult to reconcile into a final stitched image (e.g., whether the object is present or not). Accordingly, the resulting stitched image can identify a low confidence metric that is specific to the location of the object. In this manner, during post-processing, a user could selectively choose to render the obscured object or edit the object out. In a related example, stitching quality may be localized to a temporal location within video frames of images. For example, consider an object that moves at different speeds or that frequently changes direction. The stitched frames may each be well stitched; however, when encoded into a video format, the motion may be irregular and/or jumpy. Stitching that results in unusual motion encoding may imply a lower quality stitch.

Additionally, stitching techniques may be localized to a spatial location within the stitched image. For example, a mobile device may be able to perform more complex stitching techniques (e.g., a depth-based stitch) over certain portions of interest within the image, but use simpler stitching techniques (e.g., a cut-and-feather stitch) over areas which are less important. Selective stitching can be useful to provide better results in reasonable processing times within the constraints of a mobile platform. For example, the user may be able to select portions of the quickly stitched image to check "on-the-spot"; the resulting localized high quality stitching will let the user know whether they "got the shot".

At step 208 of the method 200, the resulting stitched image and at least the overlapping portions of the source images are saved. In some embodiments, the resulting stitched image and the entire original source images are preserved. In other embodiments, only the corresponding overlap regions of each of the original source images are preserved. In still other embodiments, only the low confidence portions of the overlap regions are retained.

In one such variant, stitching metadata is also preserved. Metadata may include information such as, but not limited to: camera system and/or capture parameters (e.g., exposure, lens type, camera orientations, fields of view, and/or other such information), a reference to the pixels that were stitched (e.g., bit maps, pointers, or other data structures), indicia of stitching techniques, projection information, useful stitching metrics (e.g., difference metrics, confidence metrics, warp metrics, skew metrics), user tagged information, and/or any other post processing information.

Figure 4:
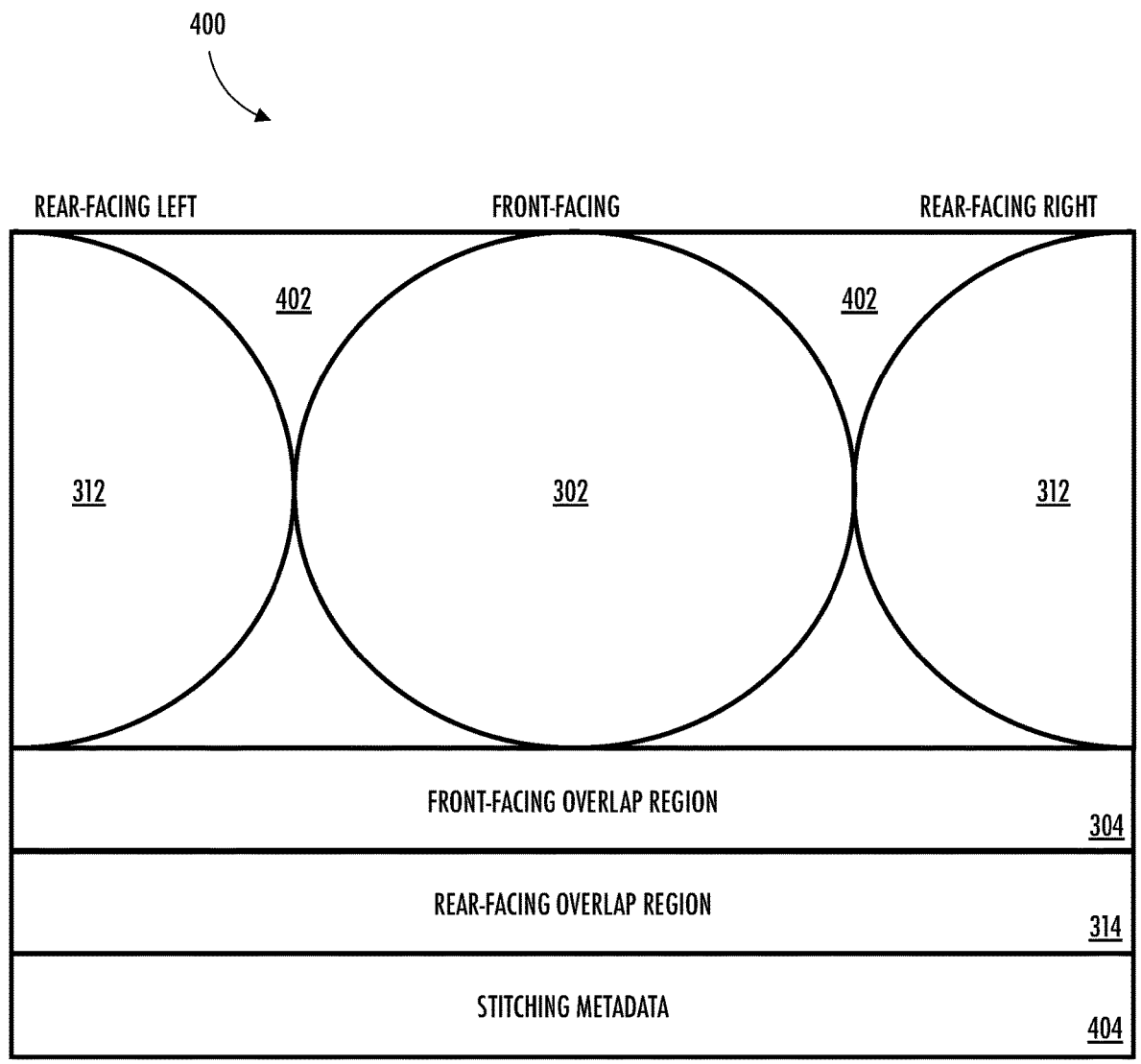
FIG. 4 is a logical representation of one exemplary file format representing a stitching of the exemplary file format of FIG. 3, illustrative of the principles of the present disclosure.

FIG. 4 illustrates one (1) exemplary file format 400 representing a stitching of the exemplary file format 300 of FIG. 3. As shown, the exemplary file format 400 includes two (2) halves of the rear-facing non-overlapping regions 312, that border the front-facing non-overlapping region 302. The resulting stitching area 402 is at a first stitch quality. Additionally, the illustrated data structure provides the original front-facing and rear-facing overlap region data (304, 314) as well as stitching metadata 404. Artisans of ordinary skill in the related arts will readily appreciate that the data structure shown in FIG. 4 is purely illustrative and does not represent the actual proportions of the data structure; e.g., the stitching data for a cut-and-feather operation would be small relative to the non-overlapping image data.

The data structure of FIG. 4 is composed of multiple substituent data structures. The various substituent data structures may be compressed and/or formatted to varying degrees. For example, artisans of ordinary skill in the related arts will appreciate that image compression is well understood in the related arts; thus the rear-facing non-overlapping regions 312, front-facing non-overlapping region 302, and resulting stitching area 402 can be compressed according to any number of existing panoramic image formats. The rear-facing overlapping region 314 and front-facing overlapping region 304 may be compressed as well; however, irregularly shaped overlapping regions may not be well suited for traditional image compression (and may be compressed according to more generic data compression formats).

Additionally, there may be a high degree of similarity between large portions of the rear-facing overlapping region 314 and front-facing overlapping region 304 that can be used to greatly facilitate compression. More directly, overlap regions that have a large focal distance will not experience parallax. Accordingly, these portions of the data structure will be very similar (after accounting for variations in exposure or other mild differences) and can be heavily compressed. The stitching metadata may be compressed or uncompressed, depending on its content (e.g., benefits for compressing small amounts of data may be negligible).

Figure 5:
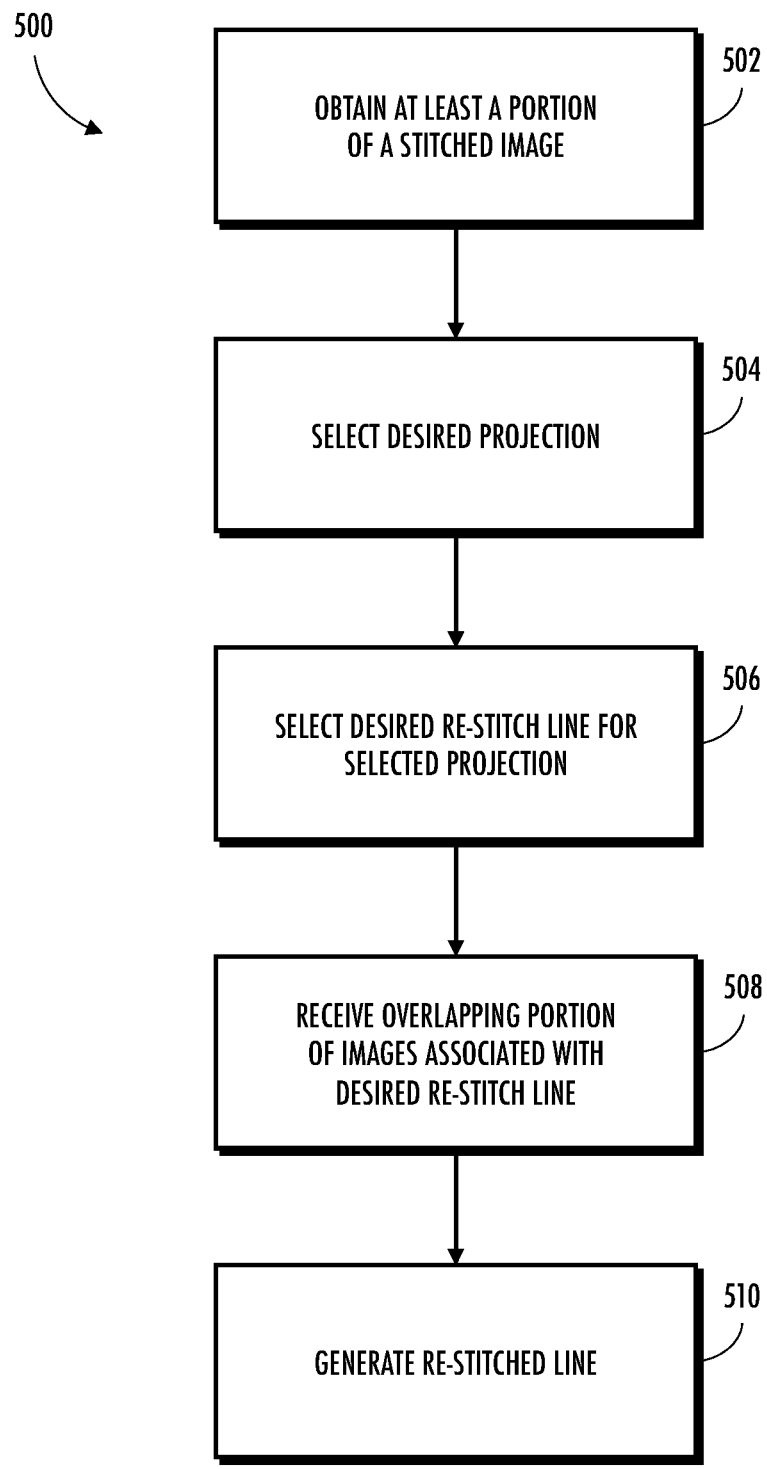
FIG. 5 is a logical flow diagram of a method for re-stitching a previously stitched image according to a second stitching quality, in accordance with the principles of the present disclosure.

FIG. 5 illustrates a generalized method for re-stitching a previously stitched image according to a second stitching quality.

At step 502, an image processing system obtains at least a portion of the previously stitched image at a first stitching quality. In some embodiments, a data structure that includes the entire stitched image is procured. For example, the image processing system may receive a previously stitched image stored within a data structure (such as the exemplary data structure described in FIG. 4, described supra.) In other embodiments, only a portion of the stitched image is received. For instance, only a viewport into a stitched panorama may be rendered (the source data structure may remain in e.g., a server, other cloud-based storage); viewport-based rendering is particularly useful for limited bandwidth applications via a streaming video feed (e.g., for a virtual reality (VR) headset).

In some variants, the image processing system determines whether or not the previously stitched image should be re-stitched. As previously noted, there may circumstances where the original stitched image is acceptable; e.g., where the original stitching has a high confidence metric, or where stitching artifacts may not be apparent to the viewer (e.g., a fast moving video application, poor lighting conditions). Accordingly, the image processing system may first determine whether additional stitching is required. In some cases, the image processing system receives user instruction (e.g., via a graphical user interface (GUI)) as to whether the image should be re-stitched.

In some cases, a human user may identify areas of the image that must be re-stitched. For example, the user may be able to identify a feature and its ghost to be merged (or false ghost); this information can be used in a re-stitching process to determine depth and/or perspective. In other cases, a human user may identify temporal portions of a video that should be smoothed, blurred, sharpened or otherwise post-processed. In hybrid editing systems, the image processing system may identify (based on the stitching metadata), areas where the first stitching process had particular difficulty or which are likely to be incorrect (e.g., areas which had a low confidence metrics or where the original source captures were of poor quality). The user can then provide additional information. For instance, an initial stitching may not have been able to reconcile whether an object should or should not have been included in the image (such as may occur where e.g., the image was in a one camera's blind spot but not the other). The image processing software can identify the resulting area, and allow the user to select whether the object should be included or not.

In some embodiments, the image processing system may rely on the original projection and/or merely re-stitch the same stitch line. In more sophisticated embodiments, the image processing system may select a new desired projection (step 504) and/or a new re-stitch line (step 506). As a brief aside, the initial stitching of the source images described supra, was performed according to a specific projection that was defined by the physical parameters of the camera system; e.g., the Janus camera configuration of FIG. 1 uses fisheye lenses which create a spherical projection. One salient benefit of re-stitching from a previously stitched image is that the physical attributes of a camera system are no longer a limitation. The projection and the re-stitch line determine the area of an image that is reproduced with the highest fidelity and most consistent perspective, and also which areas of the image can be acceptably distorted. Consequently, the ability to change projections and/or adjust placement of a stitch line may be used to substantially improve the quality of the initial first stitching (one such example is described in greater detail hereinafter, see e.g., Exemplary Post processing Projection and Stitching).

In one exemplary embodiment, re-stitching may be done to warp a first projection into a second projection. Commonly used projections include without limitation e.g., spherical, equirectangular, rectilinear, and/or stereographic projections; artisans will readily appreciate that virtually any projection of the image may be substituted with equivalent success, given the contents of the present disclosure. Different projections can be used with a variety of different applications or to achieve certain artistic or otherwise aesthetic effects. More directly, footage that has been captured with e.g., an action camera, does not have to be used in an action camera-like application. For example, a spherical image can be remapped over to a 2D poster blow-ups and/or any number of other potential uses.

In one exemplary embodiment, the stitch line can be re-defined. For instance, more or less of the overlap region can be used from each of the source images. In some variants, a user or stitching algorithm may shift the stitching line to favor one of the source images over the other during post processing. This may allow for a jagged or irregularly defined stitching line; such as may be useful to include (or exclude) objects that are hidden in a blind spot for one of the cameras. Similarly, a previously stitched image may have falsely matched distinct features of the source images and obscured the intervening image data by "folding" the two features together into one feature. The intervening data can be recovered from the "fold-in" region by revealing the original overlap region, and correcting the stitch line. In such cases, the overlap data surrounding a particular stitch line (or portion thereof) may be recovered from the source images, and the user or algorithm may re-draw the stitch line through the overlap region.

Those of ordinary skill in the related arts may additionally recognize that steps 504 and 506 may only affect a portion of the originally stitched image; thus some implementations may leave the remaining areas of the stitched image undisturbed. Alternatively, the entire image may be re-stitched so as to e.g., operate with legacy stitching accelerators or algorithms.

At step 508 of the method 500, the post-processor retrieves the overlapping portions of the images corresponding to at least the re-stitch area. In some embodiments, the post-processor may retrieve the entire overlapping area, and select only those portions that are being re-stitched. In other embodiments, the post-processor may identify the portions that are being re-stitched and only retrieve the corresponding overlapping areas.

In some cases, the post-processor may not be able perform a re-stitch for any number of other considerations e.g., existing processor burdens, power consumption limitations, streaming time interval limitations, other network congestion. For example, a streaming VR headset may allow for re-stitching of data on-the-fly for a streaming application; the originally stitched images may be re-stitched where the user is viewing scenery at a leisurely rate; however, when the user is rapidly moving, re-stitching may not be possible within the streaming refresh rate (and likely imperceptible to the user anyway). Consequently, some embodiments may merely "pass-through" the previously stitched image where the post-processor is unable to complete the re-stitch within its other considerations.

At step 510 of the method 500, the post-processor re-stitches the image where it has the overlapping portions of the images corresponding to at least the re-stitch area. In one exemplary embodiment, the re-stitching is based on a higher quality stitching technique than the initial stitch. More complex stitching techniques analyze the source images to intelligently determine how to best combine them. Such techniques may include e.g., feature detection to assist in alignment, depth perception to correct shifts in perspective, motion prediction to reduce ghosting artifacts and blur, edge detection to resolve differences in focus, color matching to correct differences in exposure and lighting, and/or any number of other image recognition techniques. These stitching techniques may be computationally complex, and generally are more difficult (possibly impractical) to be performed on mobile platforms.

One such example of a complex stitching technique is so-called depth-based stitching which uses object/feature detection and/or stereovision, to identify objects of varying distance or "depth" from the camera system. Based on the inferred depth of the source images and the relative distance and field of views of the corresponding camera system, the effects of parallax can be reduced or removed entirely. Existing solutions for removing parallax may be widely found through relevant literature; for example, the study of isomorphism within projective space (e.g., two equivalent objects) that are induced by an isomorphism of a vector space (e.g., two equivalent lines of sight) is broadly described as "homography".

Complex stitching techniques generally include one or more steps of: (i) determining which pixel coordinates of a first source image correspond to pixel coordinates of another image (alignment), (ii) reconciling differences in redundant pixel values between the two source images, (iii) applying blending filters, and (iv) warping the resulting stitched image to a projection. Various other techniques may be used, the following descriptions being purely illustrative.

Feature based detection can be based on edge detection, surface detection, object recognition, shape recognition, and/or any number of other visual recognition techniques. Additionally, artisans of ordinary skill in the related arts will readily appreciate that any feature matching between two different images, no matter how similar, will have ambiguous features or features which cannot be matched; consequently, most feature detection algorithms can only achieve a best fit based on e.g., a sum of differences, sum of squares, or other such metric. Such metrics can also be reported as a confidence metric.

Moreover, as will be further recognized, there are many ways to adjust an image to correct for e.g., parallax and/or blind spots. Adjustments may include, without limitation: warping, blurring, or sharpening, selection, and/or averaging pixel information from the source images. For example, changing the perspective of a field of view may be performed by warping or skewing the corresponding field of view. Moreover, identified objects at different distances may be skewed to different degrees corresponding to their distance. Blurring and/or sharpening may be used to consistently render an object at a particular focal distance. For example, an object that is blurred in one source image but sharp in the other source image (due to different focal distances), may be blurred or sharpened in the aggregate, to give a consistent focal distance. Similarly, objects that are in one source image but not the other (e.g., such as where only one of the cameras has a blind spot) will create a "ghost" or translucent version, if the redundant pixels are directly combined. In such cases, a more accurate rendering can be performed by selecting the pixels from one source image or the other. In still other cases, ghosting or translucency may be a desirable artifact. For example, objects in motion look more natural when rendered with slight ghosting, rather than with crisp lines (crisp edges create a stop-motion effect).

Feature recognition based image stitching operations are well understood by artisans of ordinary skill; for example, additional details for feature based stitching operations are described within "*Image Alignment and Stitching: A Tutorial*," preliminary draft published Sep. 27, 2004 to Richard Szeliski, previously incorporated herein by reference in its entirety. Still other techniques and/or variations may be made by artisans of ordinary skill in the related arts, the foregoing being purely illustrative.

Various other techniques for re-stitching images may be used consistent with the present disclosure, the foregoing being purely illustrative.

Exemplary Post-Processing Projection and Stitching

Figure 6:
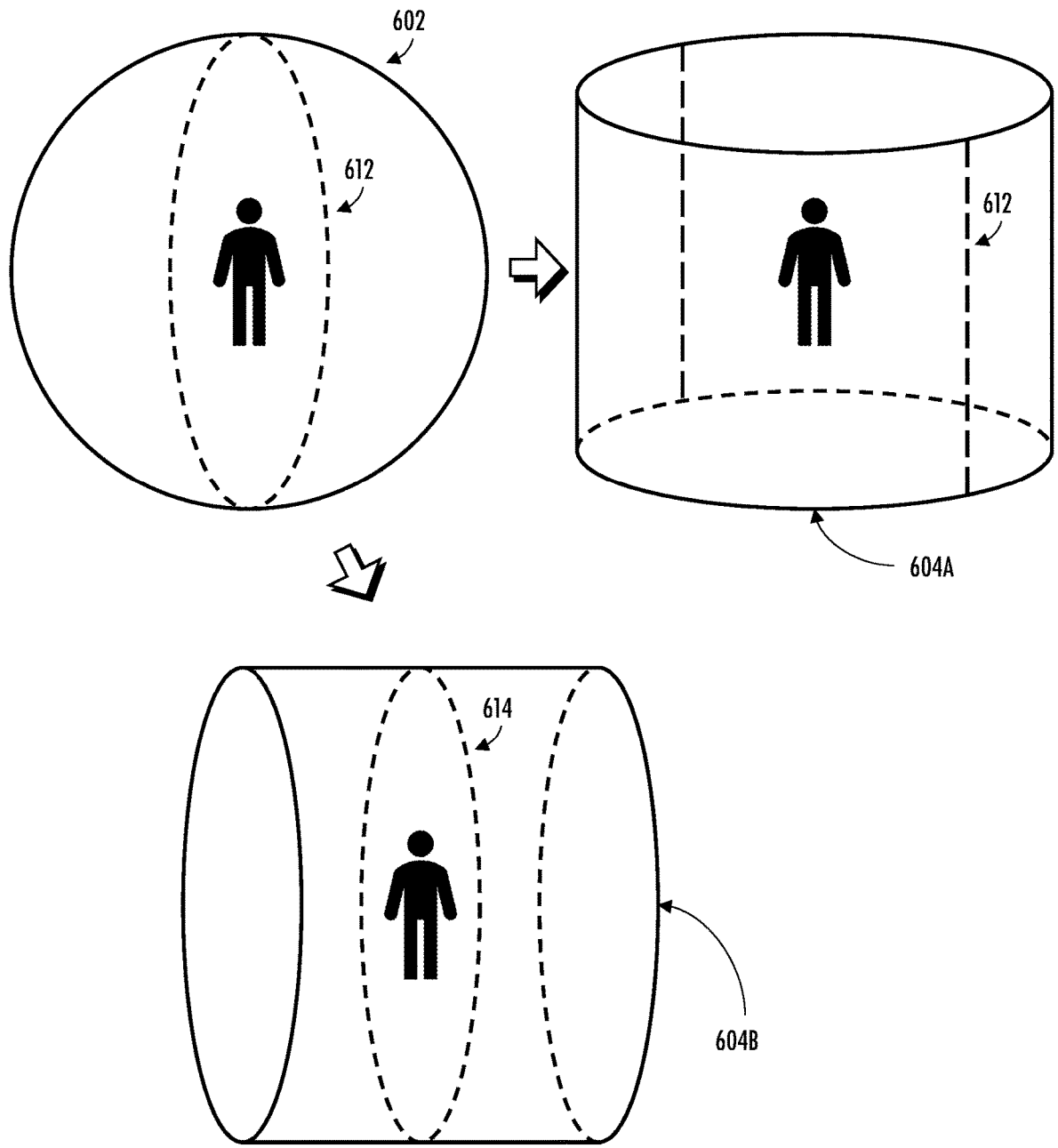
FIG. 6 is a logical representation of an exemplary initial stitching of a spherical projection that can be re-stitched to two cylindrical projections, illustrative of the principles of the present disclosure.

As previously alluded to, post-process re-stitching allows a subsequent image processing system to change projections and/or adjust placement of a stitch line to substantially improve the quality of the initial first stitching. FIG. 6 illustrates an exemplary initial stitching of a spherical projection 602 having a meridian 612 that can be re-stitched to a cylindrical projection 604A, 604B with an equator 614 or a meridian 612. Initially, the first and second circular hemispheres are stretched (a homographic projection) to a corresponding equirectangular half and a second equirectangular half respectively. Specifically, the circular images may each be stretched horizontally to fill a square. As a result of this projection, the equirectangular images may become increasingly more distorted as the top and bottom edges are approached. For example, the center row of pixels may not undergo any stretching during the equirectangular projection processing, while the top and bottom row in the original circular image (which may each be represented by a respective single pixel) may be stretched to fill the entire top and bottom rows respectively of the equirectangular projections.

Referring now to cylindrical projection 604A, each equirectangular image includes an image representing a 180° field of view along the vertical axis and a 180° field of view along the horizontal axis of the hemispherical projections. In some embodiments, the original overlap information (which was not part of the stitched image) may also be retrieved to assist in stretching; e.g., the stretched images represent 180°+2n where n represents the degree of overlap between the respective fields of view of the original images. For example, the first equirectangular image may include a field of view in the range of 0°−n to 180°+n and the second equirectangular image may include a field of view in the range of 180°−n to 360°+n along the horizontal axis of each hemispherical projection. As a brief aside, the distortion introduced at the top and bottom of the respective images is primarily introduced as a result of the projection from a spherical image onto an equirectangular image. Although ultra-wide-angle lens (e.g., a so-called fisheye lens) introduces a characteristic distortion into the captured image, this characteristic distortion can be subsequently removed from the generated spherical image because this characteristic distortion is generally known (i.e., fixed within a reasonable degree of accuracy) when using an ultra-wide-angle lens of appreciable quality.

In a first variant, the stretched halves may be re-stitched at the stretched meridians 612; e.g., the left image is stitched to the right image by aligning one or more features appearing in the n overlapping region along the meridian 612. The resulting image 604A (referred to herein as an "equatorial view" of the spherical image) provides an equirectangular projection of the spherical field of view. This orientation of the spherical image may be useful because many existing viewing and editing applications for spherical images assume that an image is received in this orientation. During this step, the disclosed embodiments can additionally retrieve the original overlap region from the source images; this enables the post-processor to improve or remove artifacts that were present in the original stitching. In other words, the post-processor is not limited to the previously stitched image data.

One advantage of meridian stitching is that a conventional stitching algorithm designed for rectangular images can be used without requiring a specialized stitching algorithm for operating directly in the spherical domain. More directly, existing stitching algorithms were designed for stitching together multiple rectilinear images, and thus deliver the best results when the image is rectilinear. However, a potential problem with the above-described process is that the top and bottom of the stitch lines in the stitched image correspond to portions of the equirectangular images that were subject to the greatest distortion from the spherical to equirectangular conversion process. This can lead to various errors in the stitching algorithm, which can result in undesirable artifacts near the top and bottom edges of the stitch lines. More directly, the upper and lower limits of meridian stitching experiences the worst case projection distortions and is likely to introduce undesirable stitching artifacts.

In a second variant, the spherical halves may be stretched into an equirectangular projection as an equatorial stitch. More directly, rather than stretching the periphery of the fisheye capture (where distortion is the worst), the center of the fisheye capture can be stretched, thereby maintaining as much fidelity at the edges (where the stitch occurs) as possible. In other words, the first circular image and the second circular image may be projected to a first rectangular image and a second rectangular image where the outer edge of the circular images maps to the equator of the final equirectangular projection and the center point of the circular images have been stretched. This projection may also be understood as taking increasing concentric rings of pixels from the circular images and arranging them in rows (e.g., forming a triangle in which the center point represents the vertex of the triangle and the outer most ring represents the base of the triangle); this triangle can then be stretched to create a rectangle. In this projection, the distortion in the rectangular image due to stretching of the pixels increases near the top edge of the first rectangular image (which corresponds to the center of the fisheye image). Particularly, along the top edge, a single pixel (representing the center point) may be stretched across the entire top edge, while the bottom edge experiences no stretching. The stretching of pixel values can be handled any number of ways, including padding (repeating the same pixel value), averaging (interpolating pixel values as weighted averages of source pixel values) or a polynomial fit (interpolating pixel values with polynomial fitting). The resulting rectangular images represent a field of view from 0°–n to 90° along the vertical axis (corresponding to the angles from the outer edge to the center point of the original hemispherical projection) and from 0° to 360° along the horizontal axis (corresponding to the angles around the circumference of the original hemispherical projection).

The first rectangular image and the second rectangular image may then be stitched together (e.g., by aligning the n overlapping degrees at the equator 614). The resulting image may be referred to as "polar view" of a spherical image. The stitch line is referred to herein as an "equatorial stitch" because the stitched edges correspond to the equator 614 between the two hemispheres captured by the cameras 110, 120. As can be seen, in contrast to the meridian stitch described above, only a single stitch line is used (compared to two stitch lines) and the stitch is performed along edges of the images that were minimally distorted during the rectangular projection process. Furthermore, the post processor can also retrieve the original overlap region from the source images to further improve stitching quality. As a result, stitching artifacts caused by the projection distortion are greatly reduced or eliminated.

Figure 7:
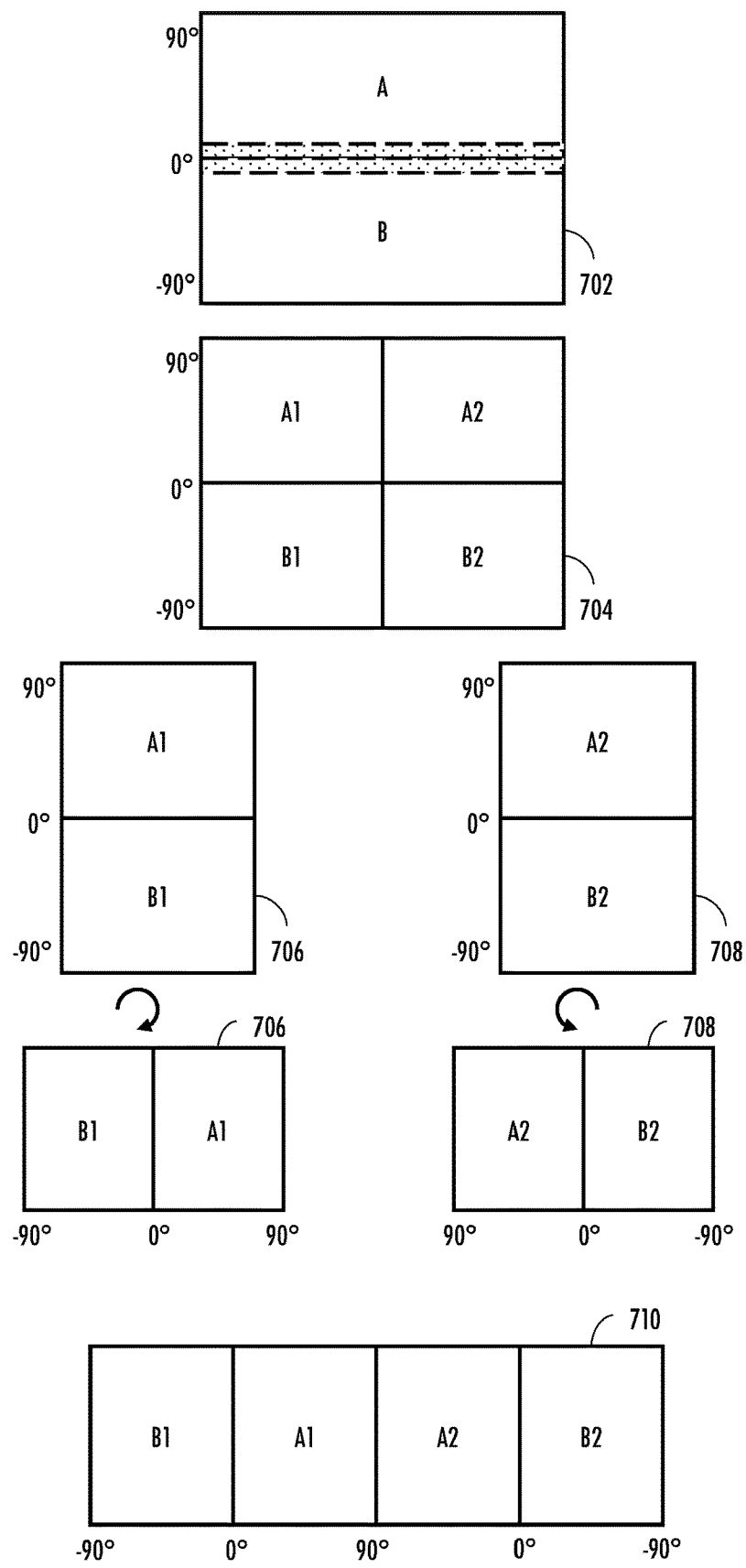
FIG. 7 is a logical representation of a method for converting images that have been stitched in a polar view to a more desirable projection for viewing, in accordance with the principles of the present disclosure.

Unfortunately, even though the polar view can greatly reduce stitching error, the polar view is undesirable for viewing. Consequently, once the images have been stitched in the polar view, the resulting stitched image is converted back to a more desirable projection for viewing. For example, FIG. 7 illustrates one such process. As shown, the stitched image 702 is divided at into left and right equally sized sub-images, 704. The left sub-image 706 may be rotated clockwise 90° and the right sub-image 708 may be rotated counterclockwise 90°. The rotated left sub-image 706 and the rotated right sub-image 708 may be re-combined (e.g., by aligning the right edge of the rotated left sub-image 706 with the left edge of the rotated right sub-image 708) to generate the re-orientated image 710. Finally, the re-oriented image 710 can be transformed to any number of other projections (e.g., equirectangular (cylindrical), cubic, octahedral, and/or spherical projection) view by any number of well-known linear transforms and/or image warping techniques.

While the foregoing example is presented within the context of the Janus two (2) camera configuration described within FIG. 1, artisans of ordinary skill in the related arts will readily appreciate that the techniques described therein may be broadly applied to a variety of other camera systems (e.g., camera systems having three (3) or more cameras). Still other optimizations and techniques for adjusting placement of a stitch line to substantially improve the quality of a stitching are described within U.S. patent application Ser. No. 15/289,851, filed Oct. 10, 2016, and entitled "APPARATUS AND METHODS FOR THE OPTIMAL STITCH ZONE CALCULATION OF A GENERATED PROJECTION OF A SPHERICAL IMAGE," the foregoing application being incorporated herein by reference in its entirety.

Exemplary Apparatus

Figure 8:
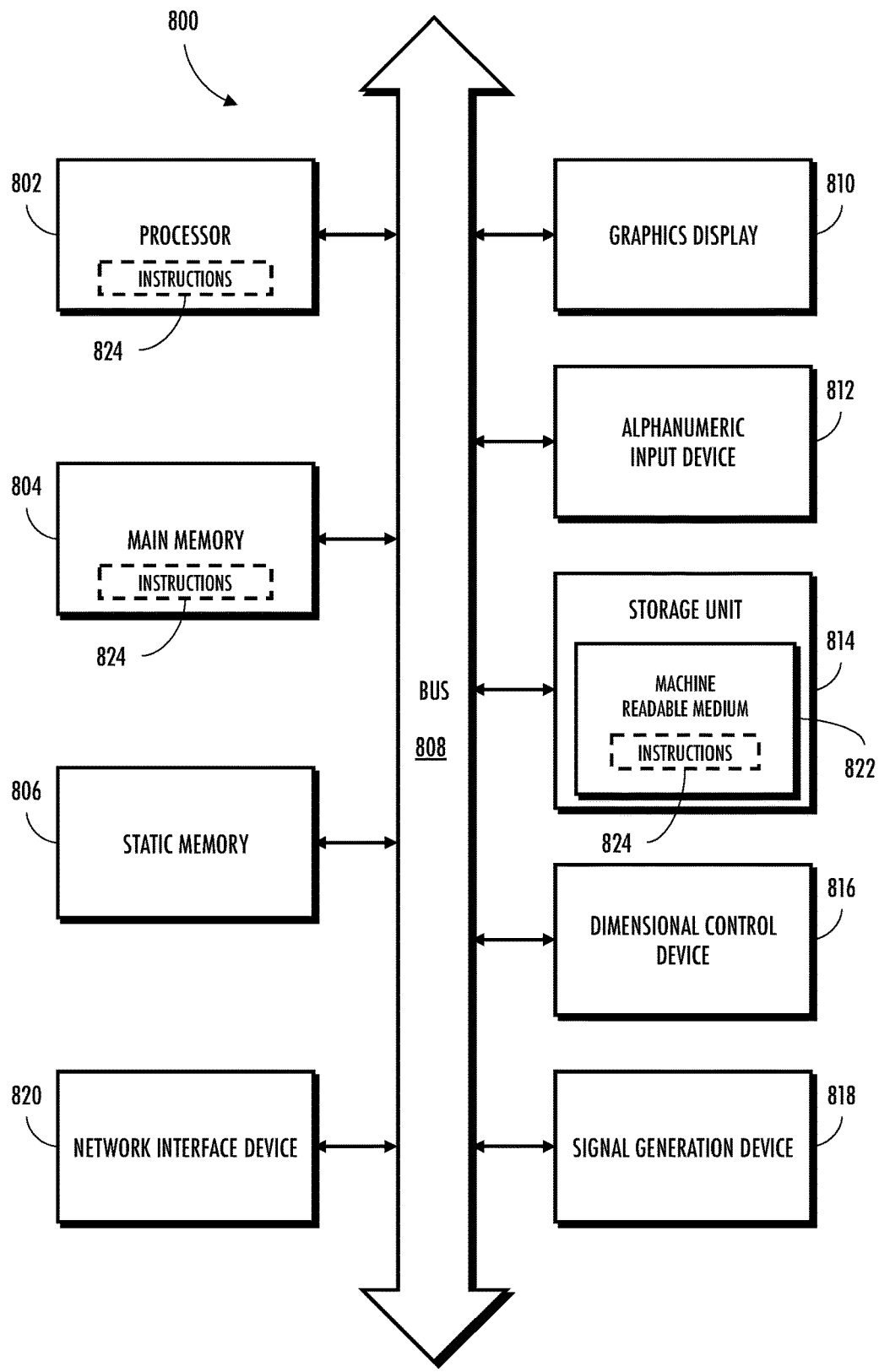
FIG. 8 is a block diagram of an exemplary implementation of a computing device, useful in performing the methodologies described herein.

FIG. 8 is a block diagram illustrating components of an example computing system able to read instructions from a computer-readable medium and execute them in one or more processors (or controllers). The computing system in FIG. 8 may represent an implementation of, for example, the video processing device for performing the stitching and/or re-stitching processes described herein.

The computing system 800 can be used to execute instructions 824 (e.g., program code or software) for causing the computing system 800 to perform any one or more of the methodologies (or processes) described herein. In alternative embodiments, the computing system 800 operates as a standalone device or a connected (e.g., networked) device that connects to other computer systems. The computing system 800 may include, for example, a personal computer (PC), a tablet PC, a notebook computer, or other device capable of executing instructions 824 (sequential or otherwise) that specify actions to be taken. In another embodiment, the computing system 800 may include a server. In a networked deployment, the computing system 800 may operate in the capacity of a server or client in a server-client network environment, or as a peer device in a peer-to-peer (or distributed) network environment. Further, while only a single computer system 800 is illustrated, a plurality of computing systems 800 may operate to jointly execute instructions 824 to perform any one or more of the methodologies discussed herein.

The example computing system 800 includes one or more processing units (generally processor apparatus 802). The processor apparatus 802 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of the foregoing. The computing system 800 also includes a main memory 804. The computing system 800 may include a storage unit 816. The processor 802, memory 804 and the storage unit 816 may communicate via a bus 808.

In addition, the computing system 800 may include a static memory 806, a display driver 810 (e.g., to drive a plasma display panel (PDP), a liquid crystal display (LCD), or a projector). The computing system 800 may also include input/output devices, e.g., an alphanumeric input device 812 (e.g., touch screen-based keypad or an external input device such as a keyboard), a dimensional (e.g., 2-D or 3-D) control device 814 (e.g., a touch screen or external input device such as a mouse, a trackball, a joystick, a motion sensor, or other pointing instrument), a signal capture/generation device 818 (e.g., a speaker, camera, and/or microphone), and a network interface device 820, which also are configured to communicate via the bus 808.

Embodiments of the computing system 800 corresponding to a client device may include a different configuration than an embodiment of the computing system 800 corresponding to a server. For example, an embodiment corresponding to a server may include a larger storage unit 816, more memory 804, and a faster processor 802 but may lack the display driver 810, input device 812, and dimensional control device 814. An embodiment corresponding to an action camera may include a smaller storage unit 816, less memory 804, and a power efficient (and slower) processor 802 and may include multiple camera capture devices 818.

The storage unit 816 includes a computer-readable medium 822 on which is stored instructions 824 (e.g., software) embodying any one or more of the methodologies or functions described herein. The instructions 824 may also reside, completely or at least partially, within the main memory 804 or within the processor 802 (e.g., within a processor's cache memory) during execution thereof by the computing system 800, the main memory 804 and the processor 802 also constituting computer-readable media. The instructions 824 may be transmitted or received over a network via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store the instructions 824. The term "computer-readable medium" shall also be taken to include any medium that is capable of storing instructions 824 for execution by the computing system 800 and that cause the computing system 800 to perform, for example, one or more of the methodologies disclosed herein.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "computing device", includes, but is not limited to, personal computers (PCs) and mini-computers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "camera" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. An apparatus, the apparatus comprising:
a graphical user interface configured to obtain user instructions;
a processor; and
a non-transitory computer-readable apparatus in data communication with the processor, the non-transitory computer-readable apparatus comprising a plurality of instructions that, when executed by the processor, cause the apparatus to:
obtain a stitched image having a first stitch line;
determine a first area of the stitched image to re-stitch with a first fidelity and a first perspective based on a first user instruction;
determine a second area of the stitched image that may be distorted during the re-stitch;
obtain a first overlap portion and a second overlap portion corresponding to the first area; and
re-stitch the first area of the stitched image based on the first overlap portion and the second overlap portion.

2. The apparatus of claim 1, where the plurality of instructions, when executed by the processor, further cause the apparatus to determine a second area of the stitched image that may be passed-through the re-stitch.

3. The apparatus of claim 1, where the first user instruction comprises reconciliation of an image object from the first overlap portion or the second overlap portion for inclusion within the re-stitch of the first area.

4. The apparatus of claim 1, where the first user instruction merges a first image object from the first overlap portion with a ghost image object from the second overlap portion for the re-stitch of the first area.

5. The apparatus of claim 1, where the stitched image is part of a video, and where the first user instruction identifies temporal portions of the video to be smoothed, blurred, or sharpened.

6. The apparatus of claim 1, where:
the stitched image is part of a video, and
the plurality of instructions, when executed by the processor, further cause the apparatus to selectively stitch a portion of the video to allow a user to preview the re-stitch.

7. A method of re-stitching an image based on user instruction, the method comprising:
obtaining a stitched image having a stitch line, where the stitched image comprises a fold-in region that is not displayed in the stitched image;
obtaining a user instruction to shift the stitch line;
re-stitching the stitched image based on intervening data that is recovered from the fold-in region, where the stitched image is associated with a first stitching technique and re-stitching the stitched image is based on a second stitching technique; and
displaying a re-stitched image.

8. The method of claim 7, where re-stitching the stitched image only comprises re-stitching a portion of the stitched image.

9. The method of claim 7, where the stitched image is a frame of a video and where the re-stitching is performed on-the-fly during display.

10. The method of claim 9, where at least one other frame of the video is passed through without re-stitching.

11. The method of claim 9, where the stitched image is associated with a first perspective and where re-stitching the stitched image changes the first perspective.

12. The method of claim 7, where the first stitching technique is a cut-and-feather stitch performed on a mobile device.

13. The method of claim 7, where the second stitching technique shifts the stitch line to correct for parallax or a blind spot.

14. The method of claim 7, where the second stitching technique comprises performing feature detection on an overlapping region of the stitched image recovered from the fold-in region.

15. An apparatus, comprising:
a first camera configured to capture a first image;
a second camera configured to capture a second image;
a graphical user interface configured to obtain user instructions;
a processor; and
a non-transitory computer-readable apparatus in data communication with the processor, the non-transitory computer-readable apparatus comprising a plurality of instructions that, when executed by the processor, cause the apparatus to:
capture the first image;
capture the second image;
stitch the first image and the second image to generate:
a first overlapping portion, a second overlapping portion, a first non-overlapping portion, and a second non-overlapping portion; and
generate a stitched image data structure that tags the first non-overlapping portion and the second non-overlapping portion for display and tags the first overlapping portion and the second overlapping portion for re-stitching.

16. The apparatus of claim 15, where the plurality of instructions, when executed by the processor, cause the apparatus to stitch based on a cut-and-feather operation over a first portion.

17. The apparatus of claim 16, where the plurality of instructions, when executed by the processor, cause the apparatus to stitch based on a depth-based operation over a second portion.

18. The apparatus of claim 16, where the first non-overlapping portion and the second non-overlapping portion are compressed in a panoramic image format; and
where the first overlapping portion and the second overlapping portion are compressed in a generic data compression format.

19. The apparatus of claim 16, where the first non-overlapping portion and the first overlapping portion are associated with a first set of capture parameters of the first camera and where the second non-overlapping portion and the second overlapping portion are associated with a second set of capture parameters of the second camera.

20. The apparatus of claim 16, where the stitched image data structure further comprises stitching metadata comprising at least a confidence metric.

* * * * *